United States Patent Office 2,714,069
Patented July 26, 1955

2,714,069

ICE BOX DESSERT

Gerald H. Stuart, New York, and John T. Watson, Tarrytown, N. Y., assignors to The Borden Company, a corporation of New Jersey No Drawing. Application November 13, 1951,
Serial No. 256,136

4 Claims. (Cl. 99—117)

This invention relates to a high protein dessert. The invention relates particularly to a cheese composition prepared for use with a whipping agent and water, in making a whipped dessert that sets when cooled to the consistency of about that of angel cake or chiffon pie filling without the need of freezing.

Briefly stated, the invention comprises a dessert mix including fine dried particles of cheese containing casein in non-heat-denatured condition and a water soluble protein intimately associated with the casein and including also gelatin in finely divided form mixed with the said particles. The invention comprises also a dessert product comprising the cheese particles, gelatin, a whipping agent, water or milk, and flavoring material, the whole being in whipped or aerated condition.

The whipped product is ready for serving after being cooled in a refrigerator to a temperature above its freezing point as, for instance, to about 50° F. or somewhat higher. The dessert has the properties neither of a gelatin dessert nor of a frozen dessert. Our dessert is sufficiently stiff to stand up and retain the shape of a mold after the mold has been removed. At the same time, the dessert cuts with a knife or fork in about the manner of a meringue.

Once the properties of the product have been observed, various theories may be advanced to explain the mechanism by which those properties are obtained. We consider that the surfaces of the dried cheese particles act as closely spaced, almost innumerable semi-permeable membranes through which liquid from the gelatin solution diffuses, as by osmosis or like method, so that the gelatin becomes concentrated over the surfaces of the cheese particles and between them.

The finely dispersed condition of the casein and the presence of the water soluble protein (lactalbumin) promote this absorption of water and attendant concentration of the gelatin, the cheese powder that we use having a high specific water absorption coefficient, such as 2 to 3.5 parts of water absorbable for 1 part of the cheese particles on the dry basis.

As to materials used, the cheese is one in which the casein content although coagulated and subsequently dried, is not heat-denatured. In other words, the cheese is one that has been maintained at all times during and subsequent to its manufacture at a temperature below that at which the casein undergoes heat denaturing. Spray dried baker's cheese is the preferred form of cheese to be used.

As the soluble protein in the cheese, we use lactalbumin to advantage. This product is not only soluble but also readily available, edible, high in nutritional value, and palatable. With the lactalbumin in the cheese there may be associated and suitably is associated a small proportion of lactic acid.

The desired fine cheese particles containing the casein and lactalbumin are best made from freshly made edible casein and whey in amount to provide the desired proportion of lactalbumin to casein, and then comminuting and drying the resulting mix at a temperature below that of heat coagulation of casein, as by spray drying at low temperature.

Lactic acid, if used may be included in the whey and casein mixture.

In greater detail, the preferred method of providing cheese powder for use in the dessert composition is as follows:

100 parts of pasteurized skim milk are mixed with 7 parts of non-pathogenic lactic acid producing organisms. The resulting mix is warmed to about 92° F. There is then introduced approximately 0.3 part of rennet diluted with 9 parts of water. The resulting mixture is caused to stand for several hours until the acidity developed corresponds to about 0.5% as lactic acid. This produces a separated mass of curd which is then knife-cut and agitated slowly at about 100° F. until whey separates from the curd. The whey so separated is drawn off, the remaining curd allowed to stand over night, and the additional whey which separates then drained away.

The product may then be mixed with lactalbumin in addition to that in the part of the whey still retained in the curd, the amount of the additional lactalbumin being that amount, if any, required to make the content of lactalbumin as stated elsewhere herein. The product is mixed with water or milk in proportion to reduce the solids content to 10%–15%.

The diluted mass is comminuted with knives in a conventional machine and then delivered under pressure to the nozzle of spray drying equipment with air inlet temperature of 250° F. and outgoing air temperature of 150° to 160° F.

The cheese particles so made are extremely fine, over half of them by weight being of size to pass through a 100 mesh screen. They are not sticky or gluey. They show a specific water absorption of 2 to 3.5 with the production of a firm paste.

Cheese particles of the kind described may be and suitably are made as described in Serial No. 211,966, filed February 20, 1951, by Stuart, Howard, Watson, Clickner and Sommer.

As the gelatin component, there is used food grade gelatin in granulated condition, the particles being so fine that they will dissolve ("melt") readily when stirred with moderately warm water, such as water at a temperature of 110°–130° F.

As the liquid medium, we use water. Milk may be used but is not necessary for a good product.

The whipping agent used is one that promotes the whipping in of air or like gas into an aqueous liquid and maintains the whipped composition when cool but not frozen in relatively stable form for a period of time measured in days. Examples of whipping agents that meet the requirements and that may be used are egg white, soy protein, or a mixture of a soluble protein and stabilizing material.

Miscellaneous ingredients are used to sweeten or flavor the resulting composition or both. Thus we use sucrose as sweetening agent. We use also vanilla, chocolate, caramel, lime, or other flavoring agent of kind and in amount to suit the taste.

As the gas to be whipped into the dessert there may be used air, carbon dioxide, nitrogen, or other non-toxic gas used in whipping commercial food products.

The following table shows a preferred range of proportions of the several materials and also a range of proportions that are satisfactory in making our dessert composition.

| Ingredient | Parts by Weight | |
| --- | --- | --- |
| | Preferred | Suitable Range |
| Cheese particles (casein and lactalbumin) | 27 | 15–40. |
| Gelatin | 5 | 3–8. |
| Skim milk powder | 4 | 0–8. |
| Salt | 1.7 | To suit taste. |
| Sucrose | 53.3 | 35–75. |
| Whipping Agent | 9 | 7–12. |
| Total | 100 | |

These and other proportions herein are expressed as parts by weight.

Water is used in proportion to give the consistency desired in the finished pudding. In a representative dessert, the proportion is 180 parts of water to 100 dry weight of the composition.

A satisfactory proportion of lactalbumin to be used is 1 to 5 parts for 100 parts of casein.

When lactic acid is incorporated into the cheese and lactalbumin combination, it is used in the proportion of about 1 to 5 parts for 100 of the casein.

For convenience in mixing, it is desirable to whip separately the whipping agent with a part of the sucrose and a part of the water, mix the remainder of the composition with warm water until the gelatin therein dissolves to a smooth solution which suspends the cheese particles, and then incorporate this solution and the suspended particles into the whipped mass. This method will be illustrated more specifically in the examples which follow.

*Example*

The ingredients for making the finished dessert are mixed in two separate powders as follows:

Mix 1—Spray dried baker's cheese (containing 3% lactalbumin on the weight of the casein), 27 parts; gelatin in the form of fine grains, 5 parts; skim milk powder, 4 parts; salt, 1.7 parts; cane or beet sugar, 35 parts; vanilla flavoring, trace.

Mix 2—Whipping agent 9 parts and cane or beet sugar 18 parts.

In this case, the whipping agent used contained 73% of skim milk powder, 15 of enzyme-degraded soy protein, 6 of corn starch, 2 of sodium phosphate, 2 of calcium citrate and 2 of sodium alginate.

Mix 1 was stirred with 126 parts of warm water at a temperature of about 130° C. until the fine grains of gelatin, the salt and the sugar were completely dissolved and the cheese particles and the skim milk powder were suspended throughout the gelatin solution.

Mix 2 was stirred in 54 parts of cold water until the sugar was dissolved. The whole was then whipped in air, with a motor operated whipping machine for a few minutes and until the liquid phase was no longer visible and there was no further substantial increase in the overall volume.

Mix 1 was then folded into the whipped Mix 2 until a smooth light batter resulted. This was cooled over night in a domestic refrigerator. It was then found that, although the composition had not frozen, it had set to the consistency of a dessert suitable for eating with a fork or cut with a knife and that even though the proportion of the cheese used is large, the ingredients are so associated that the taste of cheese is very bland.

It will be understood also that it is intended to cover all changes and modifications of the examples of the invention herein chosen for the purpose of illustration which do not constitute departures from the spirit and scope of the invention.

What is claimed is:

1. A cheese composition prepared for use in conjunction with water, a whipping agent, and a gas in making a whipped ice box dessert, comprising dry fine particles of cheese and gelatin, the cheese particles having a specific water absorption of at least 2 and containing coagulated casein and lactalbumin substantially exclusively in non-heat-denatured and soluble condition, respectively, the proportion of the cheese being in excess of that of the gelatin and the casein and lactalbumin in the condition stated promoting the absorption of liquid from the aqueous solution of gelatin by the said particles when the composition is mixed with water and the gelatin dissolved, the cheese particles suspended in the resulting solution, a whipping agent added, and air whipped in and the specific water absorption causing the composition to set on cooling to a temperature above the freezing point thereof, to a consistency suitable for eating with a fork.

2. A cheese dessert composition comprising fine particles of baker's cheese characterized by a specific water absorption of at least 2 and containing dry coagulated casein substantially exclusively in non-heat-denatured condition and lactalbumin substantially exclusively in soluble form, dry gelatin, a whipping agent, and sugar, the proportion of the cheese being about 15–40 parts by weight to 3–8 parts of the gelatin.

3. A cheese dessert composition comprising fine particles of baker's cheese characterized by a specific water absorption of at least 2 and containing dry coagulated casein substantially exclusively in non-heat-denatured condition and lactalbumin substantially exclusively in soluble form, dry gelatin, a whipping agent, and sugar, the proportion of the cheese being about 15–40 parts by weight to 3–8 parts of the gelatin, and the proportion of lactalbumin being about 1–5 parts for 100 of casein.

4. A cheese dessert composition comprising spray dried baker's cheese characterized by a specific water absorption of at least 2 and containing dry coagulated casein substantially exclusively in non-heat-denatured condition, lactalbumin substantially exclusively in soluble form and lactic acid, gelatin, a whipping agent, and flavoring material, both the cheese and the gelatin being in the form of fine particles, the proportion of the cheese being about 15–40 parts by weight to 3–8 parts of the gelatin, and the cheese containing 1–5 parts of lactalbumin for 100 of casein.

References Cited in the file of this patent

UNITED STATES PATENTS

| | | |
| --- | --- | --- |
| 1,634,410 | Eldredge | July 5, 1927 |
| 1,806,576 | Cohen | May 19, 1931 |
| 1,918,595 | Frederiksen | July 18, 1933 |
| 2,588,308 | Tressler | Mar. 4, 1952 |

FOREIGN PATENTS

| | | |
| --- | --- | --- |
| 1,064 | Great Britain | A. D. 1910 |

OTHER REFERENCES

"The Structure and Composition of Foods" by Winton, John Wiley and Sons, Inc., New York, 1937, pages 74, 77 and 151.